W. I. GATES.
FENDER.
APPLICATION FILED MAR. 3, 1913.
1,121,346.
Patented Dec. 15, 1914.
3 SHEETS—SHEET 1.
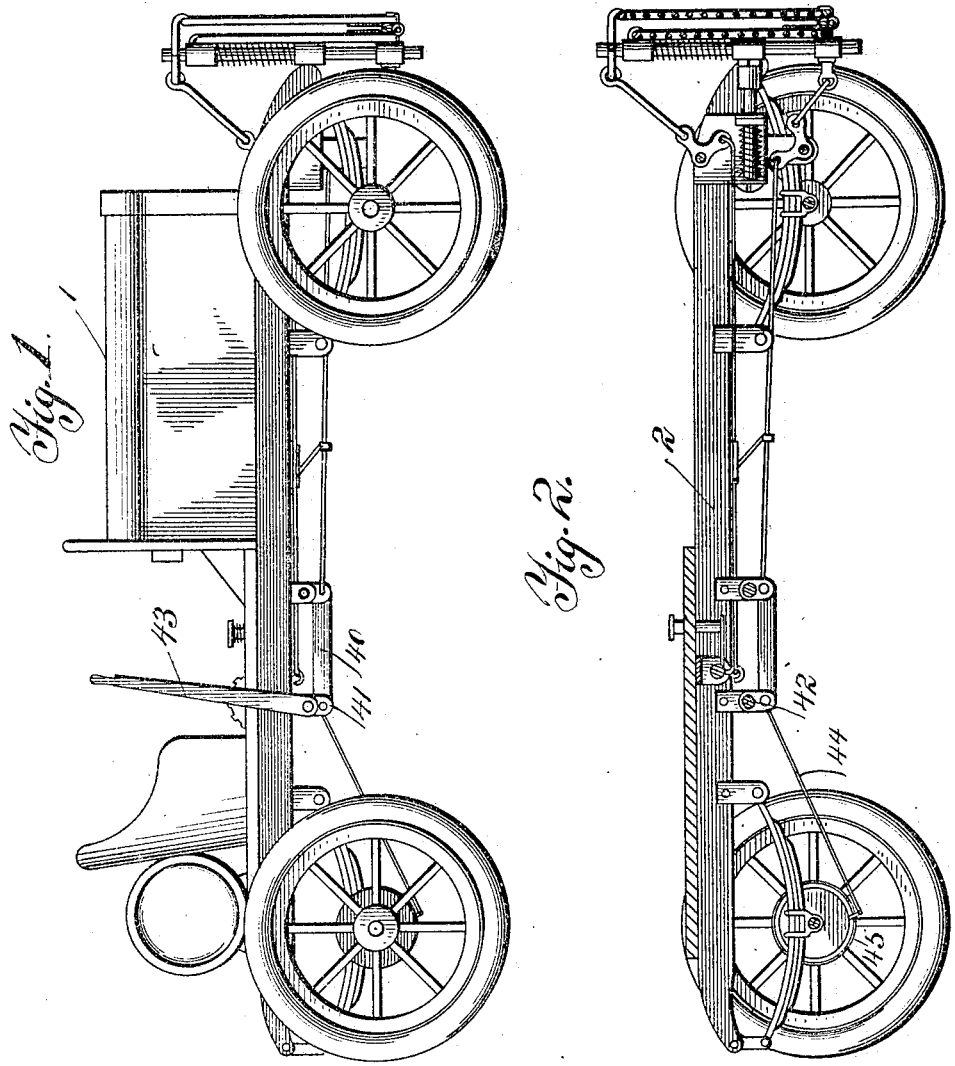

W. I. GATES.
FENDER.
APPLICATION FILED MAR. 3, 1913.
1,121,346.
Patented Dec. 15, 1914.
3 SHEETS—SHEET 2.
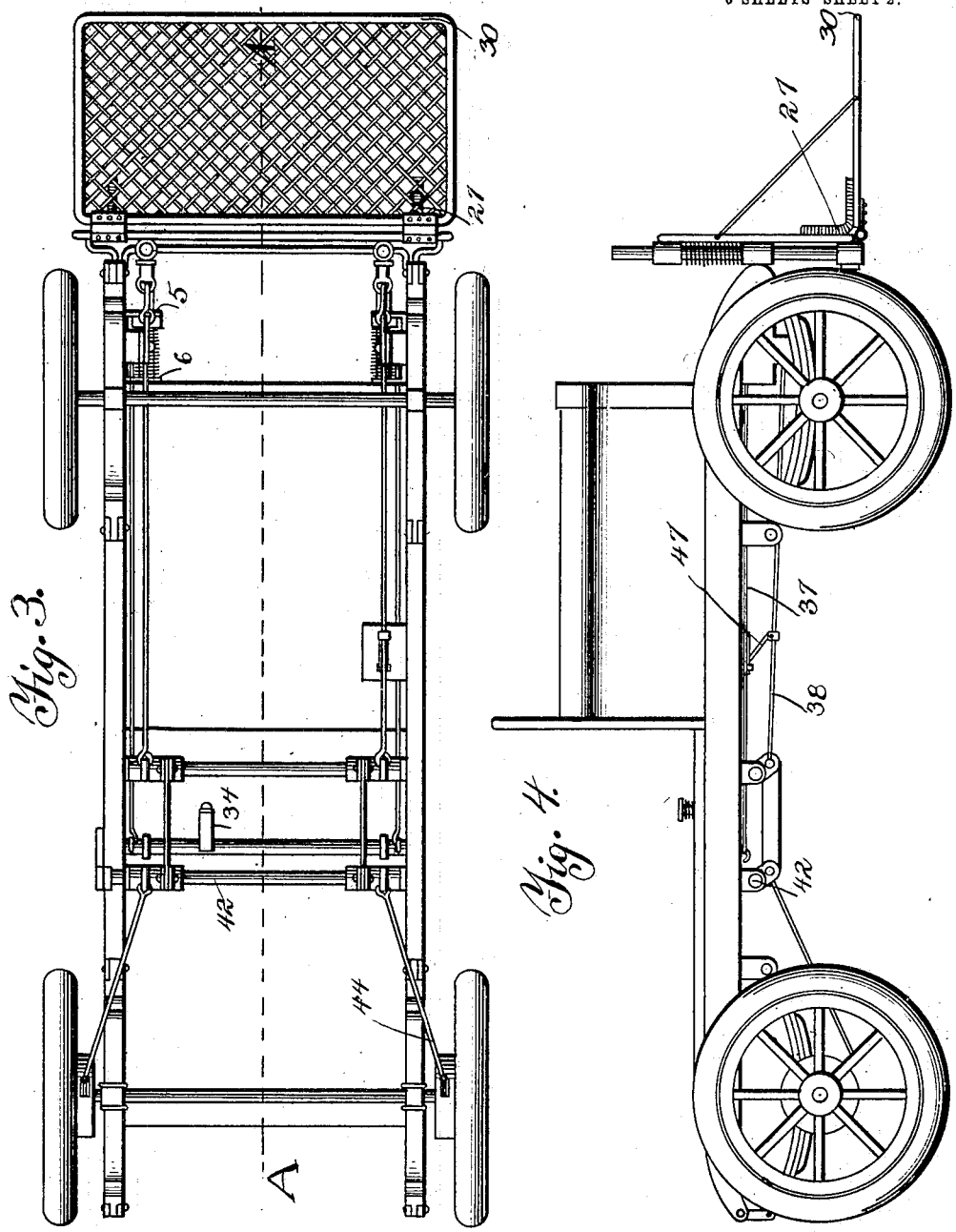
WITNESSES
O. H. Cook
M. P. McKee
INVENTOR
W. I. Gates
Alex. J. Wedderburn, Jr.
Attorney

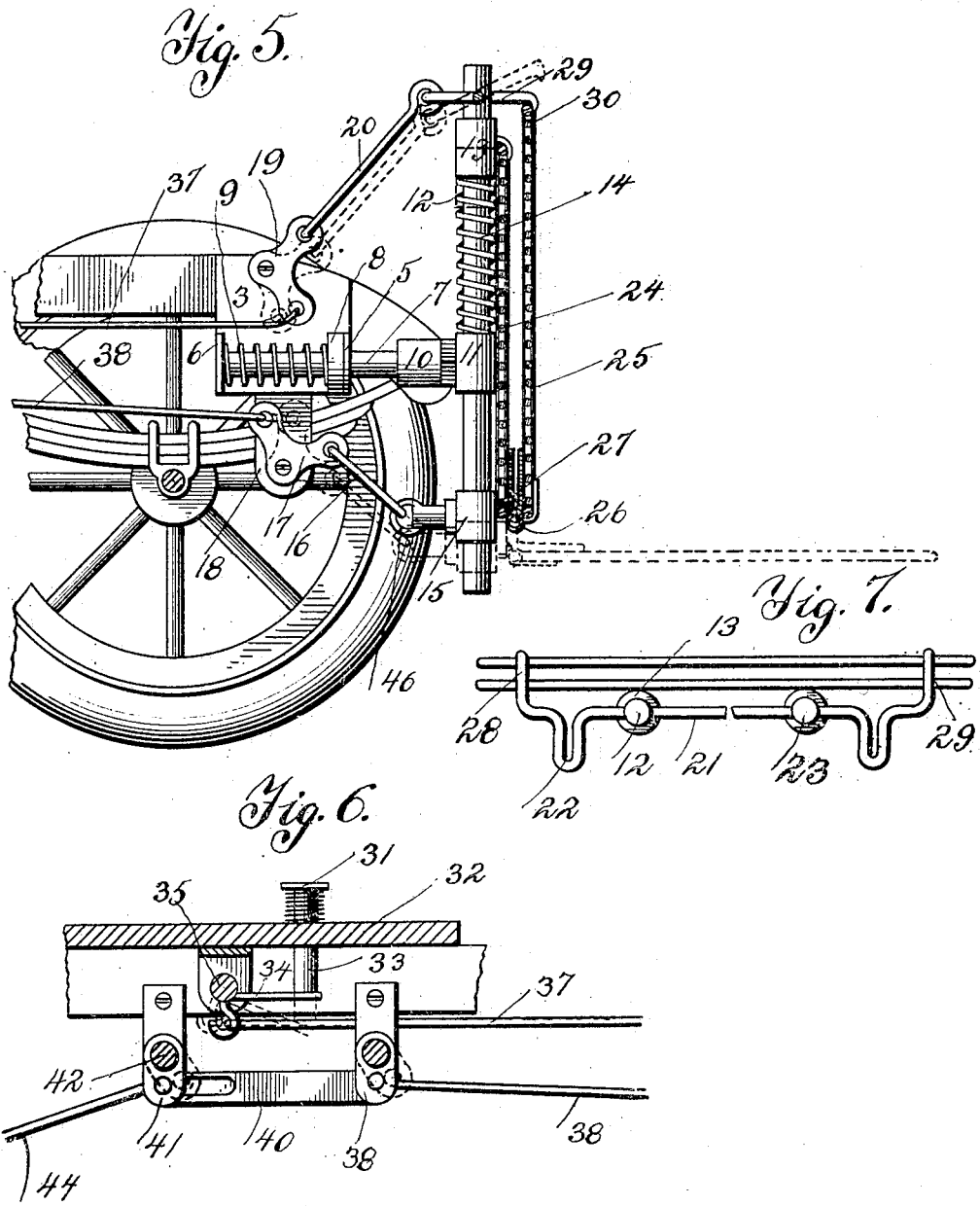

UNITED STATES PATENT OFFICE.

WILLIAM I. GATES, OF BRADDOCK, PENNSYLVANIA, ASSIGNOR OF ONE-HALF TO FRANK MAYER, OF BRADDOCK, PENNSYLVANIA.

FENDER.

1,121,346. Specification of Letters Patent. Patented Dec. 15, 1914.

Application filed March 3, 1913. Serial No. 751,748.

*To all whom it may concern:*

Be it known that I, WILLIAM I. GATES, a citizen of the United States, residing at Braddock, in the county of Allegheny and State of Pennsylvania, have invented certain new and useful Improvements in Fenders, of which the following is a specification.

This invention relates to improvements in fenders for automobiles and has for its object to provide a fender adapted to throw a brake lever.

Another object of the invention is to provide an automobile fender having means adapted to shut off the engine operating the automobile.

Another object of the invention is to provide a fender adapted to give beneath the load of a person whereby the shock of falling on the fender is lessened. And another object of the invention is to provide a fender having means whereby the shock caused by running into any object will be absorbed instead of being transmitted to the car upon which it is mounted.

With the above and other objects in view I have invented the device illustrated in the accompanying drawings in which—

Figure 1 is an elevational view of an automobile equipped with my fender, Fig. 2 is a sectional view taken on line A—A of Fig. 3, Fig. 3 is a top plan view of an automobile chassis shown in Fig. 1, Fig. 4 is a view similar to Fig. 1 showing the fender lowered, Fig. 5 is an enlarged view of the forward end of the car shown in Fig. 2, Fig. 6 is an enlarged detail elevational view of a brake throwing device and Fig. 7 is a top plan view of the fender shown folded.

Like reference characters indicate like parts throughout the specification and in the several views of the drawings in which—

1 indicates an automobile and 2 the frame thereof, upon the forward end of which is mounted a pair of brackets 3 and 4, each having right angular opposing ears 5 and 6 which form bearings in which is slidably mounted the horizontal rod 7 having a stop 8 fixed thereto intermediate of said ears resting against the ear 5 when the rod is in a normally extended position as indicated in Figs. 1 to 5 of the drawings. Between the stops 8 and the ear 6 and on the shaft 7 is a spring 9 adapted to force the shaft 7 normally outwardly pressing against said stop 8.

On the outer end of the shaft 8 is fixed a member 10 having a horizontally disposed collar 11 in which is vertically slidable a rod 12. Fixedly secured near the upper end of the rod 12 is a member 13 seated between which and said collar 11 and mounted on said rod 12 is a spring 14 which acting against said member 13 is adapted to hold the rod 12 in a normally raised position. Fixedly mounted on the lower end of the rod 12 is a member 15 connected by means of a link 16 to the bell crank 17 mounted on the extension 18 of the bracket 3. Mounted upon the upper part of the bracket 3 is a bell crank 19 connected by a link 20 to the lever portion 22 of a horizontal bar 21 which passes through an opening in the upper end of the rod 12 and is pivotally mounted thereon. The other end of the member 21 is similarly mounted on the upper end of the rod 23, the mounting and connections of which are exactly similar to that just described for the rod 12 and which it is unnecessary to repeat. Upon the rods 12 and 23 is mounted the vertical portion 24 of the fender 25 which are connected together by the hinges 26. Springs 27 are adapted to hold the member 25 normally in a horizontal position. The horizontal bar 21 has right angularly disposed hook arms 28 and 29 the outer ends of which are adapted to engage the outer end 30 of the fender 25 and hold it in a vertical position while said arms are horizontally disposed, but by pressing with the foot upon the spring controlled treadle 31 mounted in the floor 32 the lower end 33 thereof presses down upon the lever 34 which is fixed to the shaft 35 whereby said shaft is rotated causing a rearward movement of the hook 36 fixed to said shaft which draws back the rod 37 which in turn operates the crank 19 which draws down the link 20 causing a pivotal movement of the bar 21 and an upward movement of the arms 28 and 29 whereby the fender 25 is released and thrown down to an operative position by the springs 27.

When a body drops on to the fender 25 the springs 14 give under the weight thereof causing the members 13 and 15 to slide down on the rods 12 and 23 thus breaking the shock of the fall onto the fender. The downward movement of the member 15 draws down the link 16 which operates the crank 17 which draws forward the rod 38 connected to the pivoted lever 39 which is connected by a link 40 to the lever 41, which is fixed to the pivotal shaft 42 which may be operated either by the movement of the link 40 or the hand lever 43. To the shaft 42 is fixed a rod 44 which is adapted to operate the brake band 45. The member 15 is provided with a ring 46 by means of which said members 15 and 16 are connected. This ring 46 is sufficiently large to permit of operation of the brake rod by means of the lever 43 without interfering with the member 15, the ring 46 being large enough to permit of a sufficient amount of play of the link 16 to operate the brake without causing movement of the member 15. Connected to the rod 38, is a switch operating lever 47 which is adapted to stop the operation of a motor (not shown) driving the car, when a weight drops on the fender causing a forward movement of the rod 38. Thus it will be seen that when a body falls onto the fender 25 it not only causes the application of the brakes to the car, but also stops its motive power as well.

The vertical rods 12 and 23 being mounted in the collars 11 on the sliding rods 7 it will be readily seen that should the car run into any object the fender will move rearwardly against the tension of the springs 9, thus breaking the force of the impact.

I have described one form of my invention, however I do not limit myself to the exact construction shown and described but That which I claim to be new and desire to procure by Letters Patent is:—

1. In combination with a car, a fender having vertical movement thereon, brakes, said movement adapted to apply said brakes to said car, rods upon which said fender is movable, horizontally movable brackets for supporting said rods, and a horizontally pivoted rod having means for engaging said fender to hold it in a folded position.

2. In combination with a car, a fender having vertical movement thereon, brakes, said movement adapted to apply said brakes to said car, rods upon which said fender is movable, horizontally movable brackets for supporting said rods, and a horizontally pivoted rod having means for engaging said fender to hold it in a folded position, said rod mounted on said first rods.

3. In combination with a car, a fender having vertical movement thereon, brakes, said movement adapted to apply said brakes to said car, rods upon which said fender is movable, horizontally movable brackets for supporting said rods, a horizontally pivoted rod having means for engaging said fender to hold it in a folded position, said rod mounted on said first rods, and means for rotating said rod.

4. In combination with a car, a fender having vertical movement thereon, brakes, said movement adapted to apply said brakes to said car, rods upon which said fender is movable, horizontally movable brackets for supporting said rods, a horizontally pivoted rod having means for engaging said fender to hold it in a folded position, said rod mounted on said first rods, means for rotating said rod, said means consisting of levers on said rod, links connected thereto, cranks operating said links and bars adapted to operate said cranks.

5. In combination with a car, a fender having vertical movement thereon, brakes, said movement adapted to apply said brakes to said car, rods upon which said fender is movable, horizontally movable brackets for supporting said rods, a horizontally pivoted rod having means for engaging said fender to hold it in a folded position, said rod mounted on said first rods, means for rotating said rod, said means consisting of levers on said rod, links connected thereto, cranks operating said links and bars adapted to operate said cranks, means for rearwardly moving said bars.

6. In combination with a car, a fender having vertical movement thereon, brakes, said movement adapted to apply said brakes to said car, rods upon which said fender is movable, horizontally movable brackets for supporting said rods, a horizontally pivoted rod having means for engaging said fender to hold it in a folded position, said rod mounted on said first rods, means for rotating said rod, said means consisting of levers on said rod, links connected thereto, cranks operating said links and bars adapted to operate said cranks, means for rearwardly moving said bars, said means consisting of a rotatable rod to which said bars are connected, a lever for rotating said rod and a treadle for operating said lever.

7. In a car, in combination with a car-body, oppositely-arranged and vertically-disposed rods, guides in which said rods are slidable, springs coiled around said rods and resting on said guides, said springs adapted to support said rods, reciprocating arms upon which said guides are mounted, means for resisting the movement of said arms, a brake mechanism, a horizontally-extending fender carried by said rods, and means actuated by said sliding rods for operating said brakes.

8. In a car, in combination with a car-body, a support, a horizontally-extending fender mounted on said support, means whereby said fender may yieldingly move downwardly, means whereby said fender may move inwardly toward said car-body, brake mechanism, and means carried at the lower end of said support arranged to actuate said brake mechanism and a switch actuating means on said brake actuating mechanism.

9. In a car, in combination with a car-body, two upright posts arranged in advance of said car-body, means whereby said posts may be supported, a fender pivoted at its lower end upon said posts, yieldable means arranged to hold said fender in horizontal position, a crank rod mounted in said posts at their upper ends, cranks carried by said rods, latch hooks carried by said rod engaging said fender to hold the latter upright, link mechanism arranged to trip said cranks to release said fender, and means for actuating said link mechanism.

10. In combination with a car and brake thereof, a brake operating means comprising vertically disposed supporting rods, brackets for supporting the rods, a vertical movable fender on the rods, said fender comprising a hinged portion, means for normally holding the hinged portion of the fender in a vertical position, a rod having one of its ends connected with the brake, and means for connecting the operating end of the rod to the fender, whereby movement of the fender produces a relative movement of the brake.

In testimony whereof I affix my signature in presence of two witnesses.

WILLIAM I. GATES.

Witnesses:
  W. S. LOWMAN,
  JAMES H. RUE.